March 2, 1926.

N. TRBOJEVICH

METHOD OF PRODUCING GEARS

Filed Jan. 21, 1921  4 Sheets-Sheet 1

March 2, 1926.

N. TRBOJEVICH

METHOD OF PRODUCING GEARS

Filed Jan. 21, 1921    4 Sheets-Sheet 2

March 2, 1926. 1,575,396
N. TRBOJEVICH
METHOD OF PRODUCING GEARS
Filed Jan. 21, 1921 4 Sheets-Sheet 3

March 2, 1926.  
N. TRBOJEVICH  
1,575,396  
METHOD OF PRODUCING GEARS  
Filed Jan. 21, 1921  
4 Sheets-Sheet 4

Witnesses

Inventor
Nikola Trbojevich
By Frank D. Thomason
Attorney.

Registered Mar. 2, 1926.

1,575,396

UNITED STATES PATENT OFFICE.

NIKOLA TRBOJEVICH, OF DETROIT, MICHIGAN, ASSIGNOR TO GLEASON WORKS, OF ROCHESTER, NEW YORK, A CORPORATION OF NEW YORK.

METHOD OF PRODUCING GEARS.

Application filed January 21, 1921. Serial No. 438,831.

*To all whom it may concern:*

Be it known that I, NIKOLA TRBOJEVICH, a subject of the King of Yugoslavia (having declared his intentions of becoming a citizen of the United States), resident of Detroit, in the county of Wayne and State of Michigan, have invented certain new and useful Improvements in Methods of Producing Gears, of which the following is a full, clear, and exact description.

My invention relates to a method of producing gears and particularly to a method of producing gears in which the blank is automatically indexed.

One of the objects of the present invention is the provision of an improved method for generating twisted or curved tooth bevel gears and particularly for the generation of that type in which the teeth are curved or twisted at an ever increasing radius from the small end to the large end or the gear and are of the same thickness throughout their length and can perfectly mesh with the rack of constant pitch along geodesic lines.

A further object is the provision of a method for producing gear teeth in which a tool is employed which can operate simultaneously upon a plurality of teeth or tooth spaces in the blank and my invention relates in particular to the production of curved teeth upon conical blanks by such a tool.

Other objects of this improved method are to accomplish the generation of gears quickly and correctly in an economical manner, and a further object is to provide a rotary cutter that will generate corresponding curved teeth of equal thickness throughout their lengths without lacerating or changing the angles of the sides or pressure-surfaces of the same at any point throughout the length of the teeth, substantially as hereinafter fully described and as particularly pointed out in the claims.

With the above and other objects in view the invention resides in the novel steps constituting my process and more particularly described hereinbelow and illustrated in the accompanying drawings and set forth in the claims appended hereto.

Figure 1:
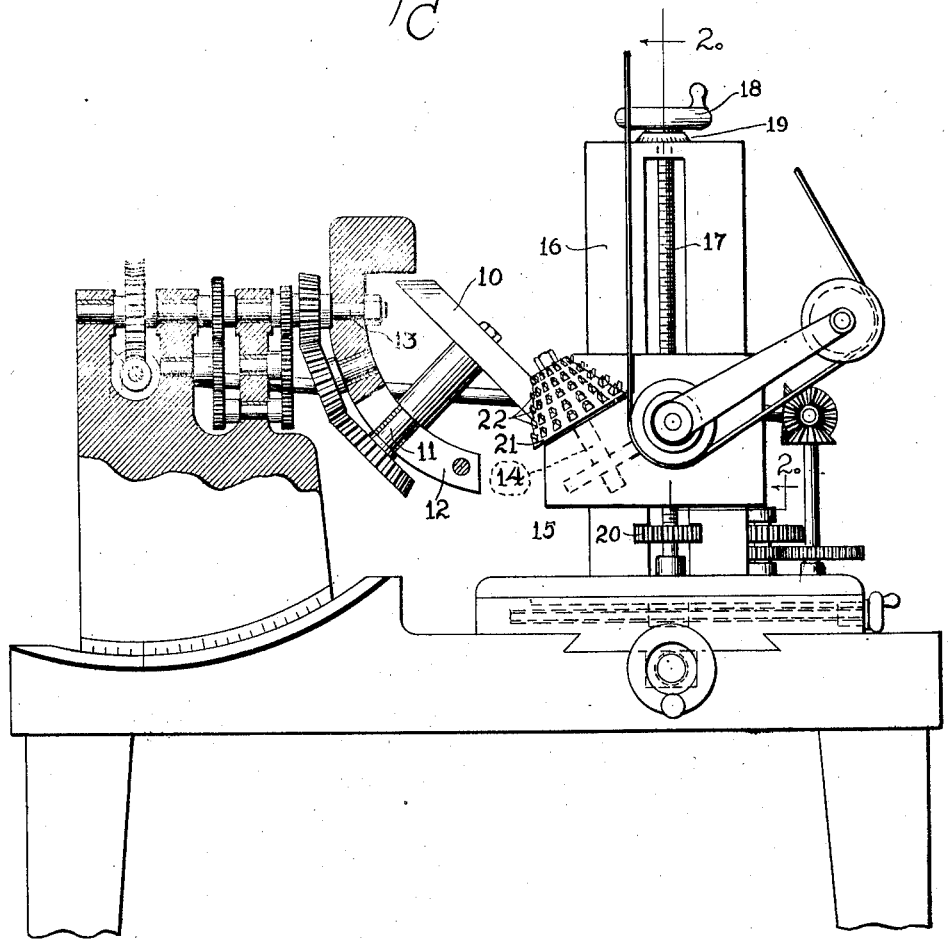
Figure 1 is a side elevation of a machine embodying my invention, showing a portion in section.
Figure 2:
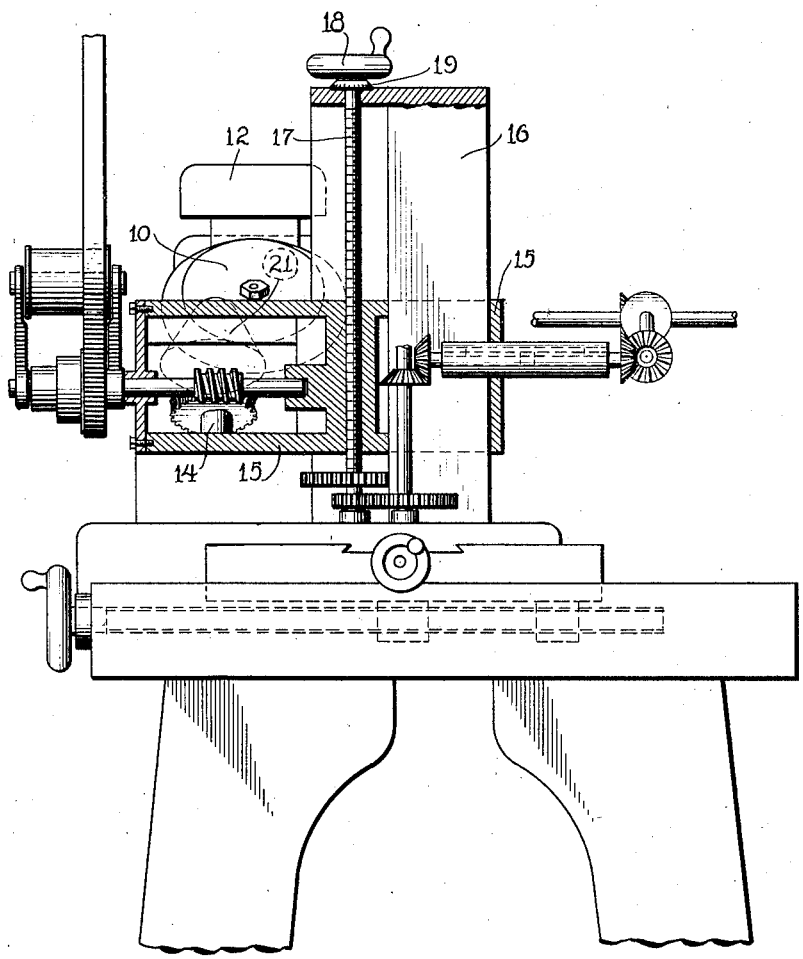
Figure 2 is an end elevation thereof, showing a portion in section.

Referring to the drawings by numerals of reference wherein, I have indicated an embodiment of my invention in its application to the production of curved teeth upon conical blanks.

The gear-blank 10 of the twisted or spiral bevelled gear, which it is designed to generate by the method and means hereinafter described, is securely mounted on a spindle 11, that is journaled in an arm 12, that projects from one end of a work-arbor 13, of a suitable machine, for which I applied for Letters Patent of the United States December 20, 1920 Serial No. 431,890. The said gear-blank is carried in a circle concentric to the axis of said work-arbor, and it is made to rotate on its own axis by a train of gears that impart the motion of the work-arbor to said spindle. Once during every cycle of its movement about the major axis of the work-arbor, this gear-blank comes transversely into rolling contact with the rotary cutter 21. In the machine constituting the subject-matter of the aforesaid application the axis of the cutter is at right angles to the transverse plane of the circular orbit of the blank about the axis of the work-arbor, and the groove or flute the cutter generates in the cone-surface of the blank alines with the cone pitch of the same, whereas, in the method embodying the subject matter hereof the axis of the cutter is tangential to said cone-surface of the gear-blank as will hereinafter more fully appear.

The rotation of the gear-blank on its own axis is controlled by a master-gear, which, in the machine hereinbefore referred to, is one of the train of gears that impart the motion of the work-arbor to the spindle upon which the gear-blank is mounted. This master-gear and the gear to be generated from the gear-blank, each have a relative prime number of teeth, that is, they have no common divider. The result is that a new tooth section of the gear-blank will come into engagement with the rotary cutter once during a cycle of movement of said blank around its major axis.

The rotary cutter 21 is mounted and secured to the end of a cutter-arbor 14 and the axis of the latter is inclined at a tangential angle to the plane of the cone-surface of said gear-blank and is journaled in a suitably constructed vertically adjustable head 15. This head is mounted and slidable vertically on a column 16, and can be adjusted vertically up and down thereon by means of a screw 17 whose upper end projects above the column and is provided with a hand-wheel 18. By turning said hand-wheel the screw can be rotated to an extent indicated by the graduated boss 19 rotating with the screw, and move said head up or down, according as required to enable the cutter to be properly adjusted to generate the threads of the twisted or bevelled gear being produced from the gear-blank. The lower end of the screw 17 is provided with a spur-gear 20 securely mounted thereon, and this in turn is engaged by a train of gears through the medium of which the screw 17 may be rotated in either direction to the extent desired. The column 16 is also adjustable both in a longitudinal direction and in a lateral direction to assist in thus adjusting the rotary cutter in proper working relation with the gear-blank, which, of course, must be done by the operator of the machine.

No invention is claimed herein in the number or arrangement of the train of gears for rotating the cutter 14, and it is sufficient for the purpose of the subject-matter hereof without specifically describing the same, to state that their function is to accomplish the object just stated.

Figure 3:
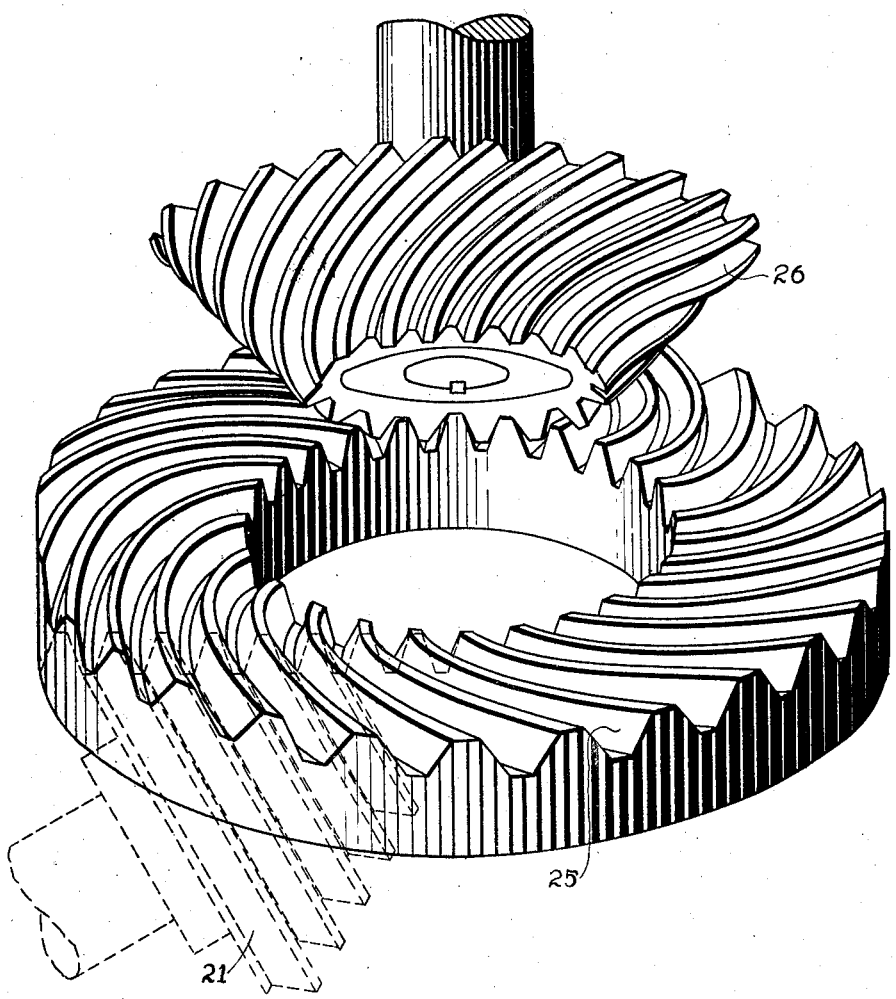
Figure 3 is a perspective view of a crown-gear and one of my improved spiral gears explanatory of the manner in which the rotary cutter is constructed.
Figure 4:
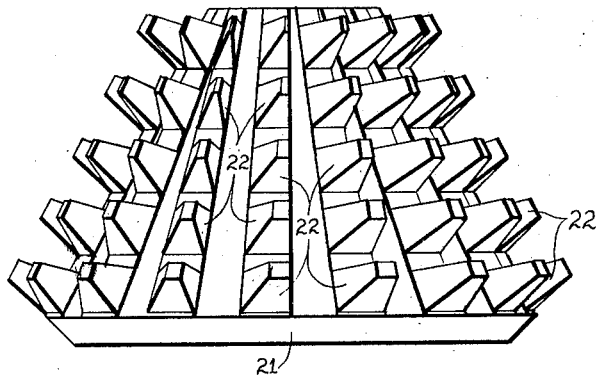
Figure 4 is a side view of the preferred form of my improved rotary cutter.
Figure 5:
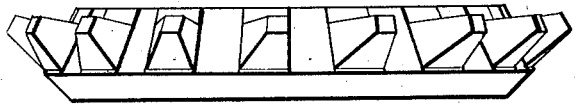
Figure 5 is a modification thereof.
Figure 7:
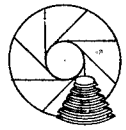
Figures 7 and 8 are respectively, diagrammatic views, illustrating the relative change of position of the cutter to the gear-blank to generate right and left handed gears.
Figure 6:
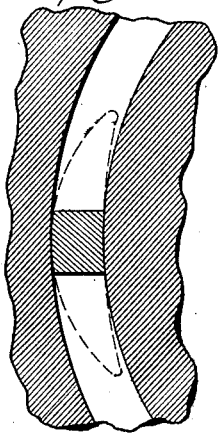
Figure 6 is a fragmentary sectional view showing one of the cutting members of the tool in engagement with a gear blank.
Figure 8:
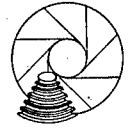

The cutter, as shown, in Figures 3 and 4, of the drawings, consists of a truncated conical body 21 which, as hereinbefore explained, is securely mounted on the end of the arbor 14 nearest the gear-blank, and is provided with a plurality of equi-distant circumferential series of equi-distant corresponding teeth or cutting sections 22. There are, preferably, the same number of teeth in each concentric circumferential series and the teeth of each series will follow in the same path and are so arranged with relation to the teeth of the series nearest the small end of the cutter that corresponding circumferentially located teeth of one series will aline in the same pitch cone.

When finished the cutting sections or teeth of the cutter in the same longitudinal section or the same pitch cone can be perfectly engaged along geodesic lines by a rack of constant pitch. The said cutting sections or teeth are, generally speaking, of a deformed truncated pyramidal shape and the edges of the teeth following in a circumferential direction each longitudinal flute or gash are sharpened, and the sides preceeding said flutes or gashes are less inclined to lines radiating from the center of the cutter than the sides following the same, so as to provide the necessary clearance of said teeth as they pass out of engagement with the channels cut thereby in the gear-blanks.

Figure 3 of the drawings, illustrates the well known method of developing spiral gears as applied to the construction of my improved rotary cutter. In this figure, 25 represents a parent crown-gear the teeth of which are constructed so as to give them the desired helical angle or curvature in what might be termed a basal plane or plane of development. When a gear-blank 26 of suitable plastic material having the desired dimensions is brought into rolling contact with this crown-gear, and is moved around the apex of the crown gear, teeth will be generated upon the plastic cone surface of the gear blank. If the shape of the teeth of the developed gear-blank is formed satisfactory a rotary cutter 21 is then made that will be able to cut metal twisted or spiral gears similar to the developed plastic gear-blank by providing said cutter with teeth which can, along a longitudinal section of the cutter, perfectly mesh with the teeth of the crown-gear in geodesic lines across the teeth thereof.

In the embodiment shown the tool meshes with the crown gear along a straight line offset from the axis or apex of the crown gear and passing through the apex of the tool itself. The apex of the tool in generating the blank 26 is therefore maintained at a constant distance from the apex of the blank.

The method or process which forms the subject of this invention may be practised in various ways without departing from the intent of the invention or the scope of the following claims, and this application is intended to cover any variations, uses, or adaptations, thereof, following, in general, the principles of the invention and including such departures from the present disclosure as come within known or customary practice in gear cutting and as may be applied to the essential features hereinbefore set forth and as fall within the limits of the appended claims.

What I claim as new is:

1. The method of producing gears which consists in imparting to the gear blank a continuous planetary motion and periodically bringing it into rolling contact with a tool having a plurality of cutting portions arranged on a cone.

2. The method of producing gears which consists in giving the blank a continuous planetary motion and bringing it during a period of rotation differng from the cycle of its planetary movement into rolling contact with a peripherically located tool having an effective operating portion of rack section.

3. The method of producing gears which consists in giving the blank a continuous planetary motion and bringing it during a period of rotation differing from the cycle of its planetary movement into rolling contact with a peripherically located tool having a plurality of cutting portions arranged on a cone.

4. The method of producing gears which consists in giving the gear blank a continuous planetary movement by means of gearing having relatively prime numbers of teeth which impart to the blank a rotation that once during each cycle of said planetary movement brings a new tooth section of the blank into rolling contact with a tool having an effective operating portion of rack section.

5. The method of producing gears which consists in giving the gear blank a continuous planetary movement by means of gearing having relatively prime numbers of teeth which impart to the blank a rotation that once during each cycle of said planetary movement brings a new tooth section of the blank into rolling contact with a tool having a plurality of cutting portions arranged on a cone.

6. The method of producing gears which consists in rolling a blank in a closed path in transverse relation to a continuously rotating tool having a plurality of cutting portions arranged on a cone.

7. The method of producing gears which consists in rolling a gear blank in a closed path in a transverse orbit relatively to a continuously rotating tool having an effective operating portion of rack form.

8. The method of producing gears which consists in rolling a gear blank in a closed path in a transverse orbit relatively to a continuously rotating tool having a plurality of operating portions arranged on a cone and equi-distantly spaced in longitudinal section.

9. The method of producing gears adapted to mesh with a basic crown gear which consists in rolling a blank on an imaginary crown gear continuously in one direction relatively to a tool having an effective cutting portion of rack section to generate teeth on the blank while in engagement with the tool and to return the blank periodically into engagement with the tool.

10. The method of producing gears adapted to mesh with a basic crown gear which consists in rolling a blank on an imaginary crown gear continuously in one direction relatively to a tool having a plurality of operating portions arranged on a cone to generate teeth on the blank while in engagement with the tool and to return the blank periodically into engagement with the tool.

11. The method of producing gears adapted to mesh with a basic crown gear which consists in imparting to a blank a movement continuously in one direction, in the manner of a gear meshing with a crown gear, relatively to a tool capable of meshing with said basic crown gear along a straight contact line.

12. The method of producing gears adapted to mesh with a basic crown gear, whose teeth have a constant pitch along a straight line offset from its center, which consists in imparting to a gear blank a movement continuously in one direction, in the manner of a gear meshing with a crown gear, relatively to a tool capable of meshing with said basic crown gear along said line of constant pitch.

13. The method of producing gears adapted to mesh with a basic crown gear which consists in giving the blank a continuous planetary motion in a transverse orbit relatively to a tool having an effective operating portion of rack section by means of gearing one member of which has a tooth number prime to the tooth number of the crown gear represented by the tool whereby a different portion of the blank is presented to the tool each time the blank comes into engagement therewith.

14. The method of producing gears adapted to mesh with a basic crown gear which consists in giving the blank a continuous planetary motion in a transverse orbit relatively to a tool having a plurality of operating portions arranged on a cone, by means of gearing one member of which has a tooth number prime to the tooth number of the crown gear represented by the tool whereby a different portion of the blank is presented to the tool each time the blank comes into engagement therewith.

15. The method of producing gears adapted to mesh with a basic crown gear having longitudinally curved teeth which consists in giving the blank a continuous planetary motion in a transverse orbit relatively to a rotating tool by means of gearing one member of which has a tooth number prime to the tooth number of the crown gear represented by the tool whereby a different portion of the blank is presented to the tool each time the blank comes into engagement therewith.

16. The method of producing curved teeth on conical blanks which consists in giving the blank a continuous planetary motion in a transverse orbit with respect to a periodically engaged circumferentially located tool having operating edges adapted to engage the face of the gear blank diagonally with respect to the teeth being produced thereon.

17. The method of producing gears which consists in rolling a blank in a closed path continuously in one direction relatively to a continuously rotating tool having a plurality of circumferential series of cutting teeth.

18. The method of producing teeth on conical blanks which consists in employing a tool having an effective operating portion of rack section of constant pitch, in positioning the tool in tangential relation to a gear blank and in rotating the tool and blank about their respective axes while imparting an additional relative movement between tool and blank about the apex of the blank, the last named movement being in such timed relation to the movement of the blank about its own axis that the blank is automatically indexed.

19. The method of producing teeth on conical blanks which consists in employing a tool having a plurality of cutting portions arranged on a cone, in positioning the tool in tangential relation to a gear blank and in rotating the tool and blank about their respective axes while imparting an additional relative movement between tool and blank about the apex of the blank, the last named movement being in such timed relation to the movement of the blank about its own apex that the blank is automatically indexed.

20. The method of producing teeth on conical blanks which consists in rotating a tool having a plurality of operating portions arranged at progressively increasing distances from a common axis of rotation, in engagement with a rotating conical gear blank while imparting an additional relative movement between the tool and blank about the apex of the blank.

21. The method of producing gears which consists in rolling a gear blank in a closed path in a transverse orbit relatively to a continuously rotating tool having a plurality of operating portions arranged at progressively increasing distances from a common axis of rotation.

22. The method of producing longitudinally curved teeth on conical gear blanks which includes rotating a tool having its cutting portions arranged on a cone in engagement with a rotating blank while imparting an additional relative movement between tool and blank about the apex of the blank to generate the teeth.

23. The method of producing teeth on conical gear blanks which includes rotating a tool having an effective operating portion of rack section of constant pitch in engagement with a rotating conical gear blank.

24. The method of producing teeth on conical gear blanks which includes rotating a tool having an effective operating portion of rack section of constant pitch in engagement with a rotating gear blank while imparting an additional relative movement between tool and blank about the apex of the blank to generate teeth thereon.

25. The method of producing gears which includes rotating a tool having its cutting portions arranged on a cone and equidistantly spaced in longitudinal section in engagement with a rotating gear blank.

26. The method of producing gears which includes positioning a tool, having its cutting portions arranged on a cone, so that it will come into operative engagement with a gear blank diagonally of the face thereof and in rotating tool and blank about their respective axes while imparting an additional relative movement between tool and blank about the apex of the blank.

27. The method of producing gears from conical blanks which includes positioning a tool having an effective operating portion of rack section of constant pitch in engagement with the gear blank diagonally of the face thereof, and in rotating the tool and blank about their respective axes.

28. The method of producing gears from conical blanks which includes positioning a tool having an effective operating portion of rack section of constant pitch so that it will come into engagement with the gear blank diagonally of the face thereof and in rotating the tool and blank about their respective axes, while in engagement, and in imparting an additional relative movement between tool and blank about the apex of the blank.

29. The method of producing gears from conical blanks which consists in rotating a tool having a plurality of cutting portions arranged on a cone so as to form in longitudinal section a rack of constant pitch, in engagement with a rotating gear blank while imparting an additional relative movement between tool and blank about the apex of the blank.

30. The method of producing gears from conical blanks which consists in rotating a tool having its cutting portions arranged on a cone, and a conical gear blank about their respective axes, and in imparting an additional relative movement between the tool and blank about the apex of the blank while maintaining the tool in definite offset relation to said apex.

31. The method of producing gears from conical blanks which consists in rotating a tool having an effective operating portion of rack section of constant pitch and a conical blank about their respective axes and imparting an additional relative movement between tool and blank about the apex of the blank while maintaining the tool in definite offset relation to the apex of the blank.

32. The method of producing gears from conical blanks which consists in rotating a tool having an effective operating portion of rack section of constant pitch in engagement with a gear blank while maintaining the axis of the tool offset from the apex of the blank.

33. The method of producing gears adapted to mesh with a basic crown gear whose teeth have a constant pitch along a straight line offset from its apex which consists in selecting a tool capable of meshing with the crown gear along such line and in rotating the tool and a gear blank in engagement while imparting an additional relative movement between tool and blank about the axis of the crown gear.

In witness whereof I have hereunto set my hand this 8th day of December, 1920.

NIKOLA TRBOJEVICH.